United States Patent [19]
Tancibok et al.

[11] Patent Number: 5,645,881
[45] Date of Patent: Jul. 8, 1997

[54] REDUCED CALORIE ICE CREAM-TYPE FROZEN DESSERT AND BUTTER FAT MIMETICS THEREFOR

[75] Inventors: Krystyna U. Tancibok, Union; Bernard C. Sekula, Glen Gardner, both of N.J.

[73] Assignees: CPC International Inc., Englewood Cliffs, N.J.; ARCO Chemical Technology, L.P., Greenville, Del.

[21] Appl. No.: 571,574

[22] Filed: Dec. 13, 1995

[51] Int. Cl.$^6$ .................... A23L 1/00; A23G 9/00
[52] U.S. Cl. ............... 426/531; 426/565; 426/566; 426/804
[58] Field of Search ...................... 426/565, 566, 426/567, 804, 531, 613

[56] References Cited

U.S. PATENT DOCUMENTS

| | | | |
|---|---|---|---|
| 3,600,186 | 8/1971 | Mattson et al. | 99/1 |
| 4,626,441 | 12/1986 | Wolkstein | 426/548 |
| 4,789,664 | 12/1988 | Seligson et al. | 514/23 |
| 4,849,242 | 7/1989 | Kershner | 426/601 |
| 4,861,613 | 8/1989 | White et al. | 426/611 |
| 4,983,329 | 1/1991 | Cooper et al. | 260/410.7 |
| 5,084,295 | 1/1992 | Whelan et al. | 426/565 |
| 5,118,448 | 6/1992 | Cooper | 554/168 |
| 5,308,634 | 5/1994 | Cooper | 426/531 |
| 5,362,894 | 11/1994 | Handwerker | 554/169 |
| 5,399,729 | 3/1995 | Cooper et al. | 554/149 |
| 5,494,693 | 2/1996 | Cooper | 426/531 |
| 5,512,313 | 4/1996 | Cooper et al. | 426/611 |

FOREIGN PATENT DOCUMENTS

| | | |
|---|---|---|
| 0236288 | 9/1987 | European Pat. Off. . |
| 0571219 | 11/1993 | European Pat. Off. . |
| 0290420 | 1/1994 | European Pat. Off. . |
| 0651947 | 5/1995 | European Pat. Off. . |
| 9524132 | 2/1995 | WIPO . |

*Primary Examiner*—Jeanette Hunter

[57] ABSTRACT

Reduced calorie ice cream-type frozen desserts are prepared by replacing some or all of the fat in an ice cream recipe with a butter fat mimetic composition comprised of a fatty acid-esterified propoxylated glycerin composition. The mimetic composition may be comprised of two or more fatty acid-esterified propoxylated glycerin compositions in order to obtain a composition having a melting profile similar to that for butter fat. The reduced calorie ice cream-type frozen desserts have a rich, creamy texture and excellent flavor.

21 Claims, 1 Drawing Sheet

REDUCED CALORIE ICE CREAM-TYPE FROZEN DESSERT AND BUTTER FAT MIMETICS THEREFOR

BACKGROUND OF THE INVENTION

1. Field of the Invention

The present invention has to do with reduced calorie ice cream-type frozen desserts. More specifically, the invention relates to butter fat mimetics which are suitable for use in frozen confections and, in particular, ice cream-type frozen desserts wherein some or all of the butter fat has been replaced by a fatty acid-esterified propoxylated glycerin composition having a melting profile similar to that for butter fat.

2. Description of the Related Art

Many attempts have been made to replace the fat in ice cream and similar frozen confections with non-fat bulking agents commonly used in the manufacture of foods. However, frozen desserts made with such fat replacers tend to have undesirable flavor and mouthfeel characteristics. They frequently are gritty, chalky and/or waxy. They have poor melting characteristics and many of them separate when they melt.

Fat replacement compositions which have been developed for use in low calorie fat-containing foods are known. An early development employing sugar fatty acid esters is described in U.S. Pat. No. 3,600,186, but the compositions are not described as suitable for use in ice cream-type frozen confections.

U.S. Pat. No. 4,626,441 describes what is said to be a low calorie, frozen, rich dessert wherein the sugar is replaced with artificial sweeteners and the milk fats and solids therein are replaced with sucrose polyester fats. The use of sucrose polyesters also is disclosed in U.S. Pat. No. 4,789,664 in foods described as having blood cholesterol lowering properties. Ice cream and other frozen desserts are made according to the 4,789,664 patent by replacing the milk fat with sucrose polyester.

Low calorie fat-containing frozen desserts, particularly ice cream-like products, are disclosed in U.S. Pat. No. 5,084,295. The desserts contain fat comprising from about 30 to 100% of certain edible, wholly or partially nondigestible intermediate melting polyol polyesters, mild solids other than fat, sweetener, oil-in-water emulsifier, a flavoring substance and water.

In European Patent Application 0 236 288, low calorie fat materials are described which include sugar fatty acid polyesters, polyglycerol fatty acid esters and tricarboxylic acids esterified with fatty alcohols. The materials are said to be useful in a wide variety of food products, including ice cream and other fat-containing frozen desserts. A frozen dairy product containing polyol polyesters is described in International Application No. PCT/US95/01650, published as WO 95/24132. Polyol polyesters and their use in shortenings and foods also are described in European Patent Specification 0 290 420. The polyesters are said to be useful in frozen desserts and, particularly, shortenings.

All of the low calorie fat replacement compositions discussed above have drawbacks either in the processes which employ them or the flavor and mouthfeel characteristics of the finished reduced fat products.

Reduced calorie food compositions containing fat-type organoleptic ingredients are known wherein an esterified epoxide-extended polyol is employed as a full or partial replacement for vegetable oils and fats. Fat substitutes of this type are disclosed in U.S. Pat. No. 4,861,613 to White et al. (referred to herein as "White" and incorporated by reference herein in its entirety). However, it has not heretofore been known how to modify such substances so as to render them suitable for use as butter fat mimetics in frozen confections.

It has now been found that certain fatty acid-esterified propoxylated glycerin compositions can be employed as a substitute for some or all of the butter fat in ice cream-type frozen desserts. The compositions have a bland flavor, the ability to form a stable emulsion and good freezing characteristics. They can be used to make fine tasting, premium quality ice cream-type desserts having smooth texture, good melting characteristics upon eating and up to about 75% reduced calories. The ice cream-type products of the invention also remain as-stable emulsions even when completely melted.

In the present specification and claims, all parts and percentages are by weight unless otherwise specified.

SUMMARY OF THE INVENTION

The butter fat mimetics of the invention are comprised of one or, preferably, two or more fatty acid-esterified propoxylated glycerin compositions and the mimetics have a melting profile similar to the melting profile for butter fat.

The fatty acid-esterified propoxylated glycerin compositions (sometimes referred to herein as "EPG" in the singular form and as "EPGs" in the plural form) are made by incorporating propylene oxide (sometimes referred to herein as "oxypropylene" or "PO") groups into a typical triglyceride fat as described in White. The average number of PO groups which are incorporated into a triglyceride is called the propoxylation number. The melting profile and other characteristics of the composition can be modified by adjusting the propoxylation number of a triglyceride, combining (i.e., employing as ingredients in a recipe) two or more different EPGs (i.e., having different propoxylation numbers) with the same fatty acid composition, combining two or more EPGs having different fatty acid compositions and having the same or different propoxylation numbers, and any combination thereof which provides the desired melting profile characteristics.

In the present invention, the preferred embodiment of the ice cream-type frozen confection employs as fat replacement ingredients in an ice cream recipe a fully hydrogenated soybean fatty acid-esterified propoxylated glycerin composition having a propoxylation number of about 5 (referred to herein as "FHEPG-05 soyate") and a fully hydrogenated soybean fatty acid-esterified propoxylated glycerin composition having a propoxylation number of about 14 (referred to herein as "FHEPG-14 soyate").

DETAILED DESCRIPTION OF THE INVENTION

Figure 1:
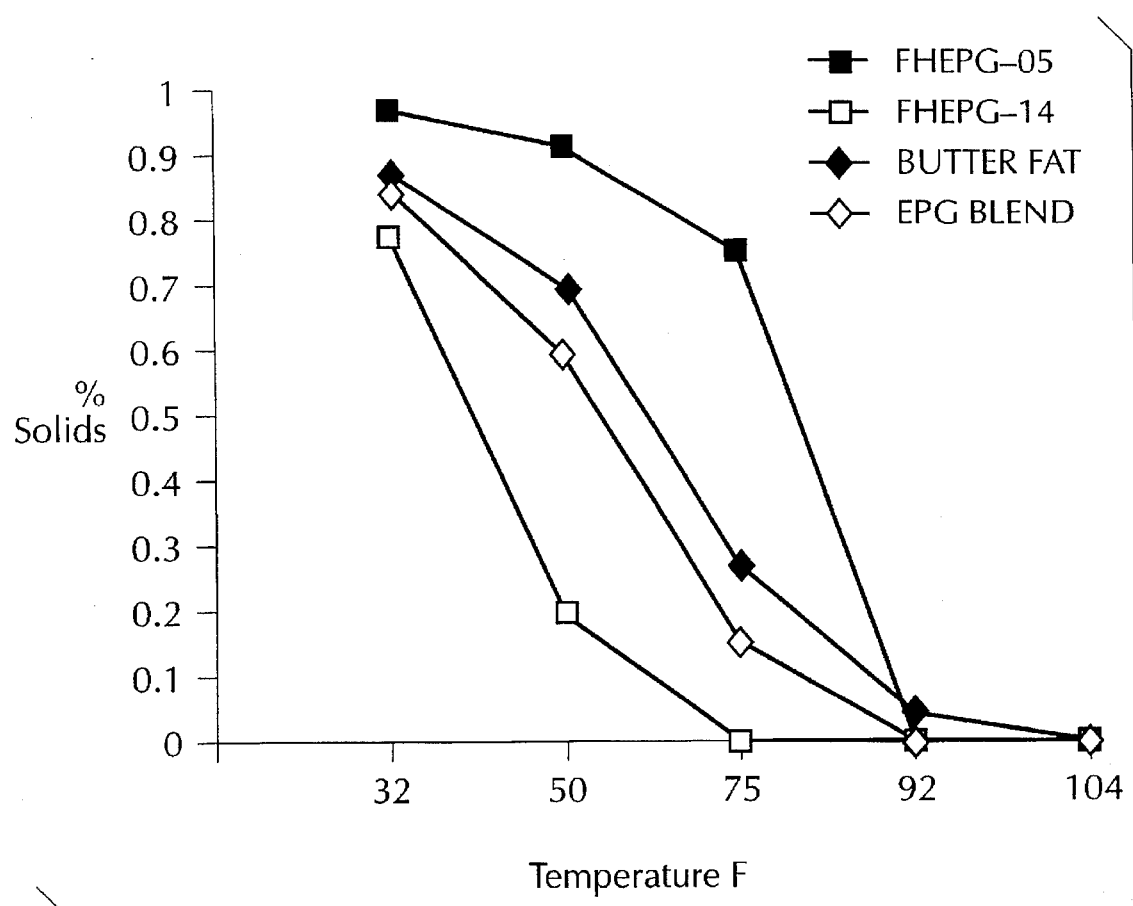
FIG. 1 illustrates the melting profiles for butter fat, FHEPG-05 soyate, FHEPG-14 soyate and a 60/40 blend of FHEPG-05 soyate and FHEPG-14 soyate. Each melting profile is a plot of the solid fat indices, as measured by dilatometry following AOCS Method Cd 10-57 (available from American Oil Chemists' Society, 1608 Broadmoor Dr., Champaign, IL 61821-5930 USA) for each composition over the temperature range from 32° F. (0° C.) to 104° F. (40° C). All references to measurements by dilatometry in this specification follow AOCS Method Cd 10-57.

In order for the fatty acid-esterified propoxylated glycerin compositions of this invention to function effectively as reduced calorie butter fat substitutes which are suitable for use in frozen confections, it is essential that the melting profile of the EPG is similar to the melting profile for butter fat. Referring to FIG. 1, this means that the melting profile as measured by dilatometry should be more than about 60 at 50° F., between about 15 and about 35 at 70° F. and less than about 5 at 92° F.

As will be explained in more detail below, it has now been unexpectedly found that the melting properties of a fatty acid-esterified propoxylated glycerin composition will mimic the desirable melting properties of butter fat when the propoxylation number and fatty acid chain length and unsaturation level are carefully controlled. In particular it has been unexpectedly found that mixtures of two or more different EPGs can simulate the melting profile for butter fat, even when each EPG employed in the mixture may have a melting profile which is dissimilar from the melting profile for butter fat. Thus, mixtures of two or more different EPGs (i.e., having different propoxylation numbers) of the same fatty acid composition can be used, mixtures of two or more EPGs of different fatty acid compositions having the same or different propoxylation numbers can be used, and any combination thereof can be used as long as the desired melting profile characteristics are obtained.

The fatty acid-esterified propoxylated glycerin compositions of this invention contain glyceryl residues, oxypropylene units, and fatty acid acyl

groups. Typically, the compositions are mixtures of individual fatty acid-esterified propoxylated glycerin compositions which may differ from each other in degree of propoxylation and acyl group composition. The glyceryl residue may have the generic structure

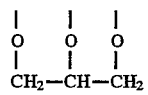

and is derived from glycerin

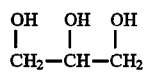

or a glycerin equivalent. The oxypropylene units are generally interspersed between glyceryl residues and the acyl groups and have the structure

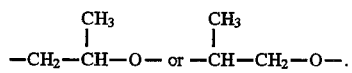

Typically, more than one oxypropylene unit may be present between an oxygen of an individual glyceryl residue and an acyl group such that a polyoxypropylene unit is created. However, a single "branch" or "arm" of the fatty acid-esterified propoxylated glycerin may contain only one oxypropylene unit. Certain of the acyl groups may be attached directly to the glyceryl residue, without any intervening oxypropylene units, although an average of at least about 3 oxypropylene units per glyceryl residue must be present in the overall composition. The average number of oxypropylene units in the fatty acid-esterified propoxylated glycerin composition is from about 3 to about 16. The presence of oxypropylene units is critical, as the oxypropylene units help to lower the melting point of the compositions thereby improving the mouthfeel and melting characteristics as compared to analogous compositions not containing oxypropylene units.

In order to maximize the resistance of the fatty acid-esterified propoxylated glycerin composition towards pancreatic lipase enzyme-catalyzed hydrolysis, the oxypropylene units adjacent to the acyl groups should be oriented such that secondary rather than primary ester linkages are created. That is, the methyl group should be located on the carbon atom attached to the oxygen atom forming part of the ester linkage as follows:

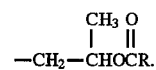

Preferably, at least about 80% of the ester linkages in the overall composition are secondary. Most preferably, at least about 95% of the ester linkages are secondary. However, the secondary ester content can be less than about 80% without adversely affecting the butter fat-like properties of the EPGs of the invention.

It is desirable for the fatty acid-esterified propoxylated glycerin composition to be substantially esterified such that it has an average of at least about 2.5 (more preferably, at least about 2.9) fatty acid acyl groups per equivalent of glycerin. The extent of esterification may be readily determined by conventional analytical methods such as hydroxyl number.

The structure of the composition preferably is such that the composition has a porcine pancreatic lipase hydrolysis rate of less than about 10% as compared to an olive oil standard. Preferably, the relative hydrolysis rate is less than about 1% of the olive oil rate. Methods of measuring porcine pancreatic lipase hydrolysis rate are described in White.

The average number of oxypropylene units in the EPG must not be so low as to result in a high proportion of the acyl groups being attached directly to glyceryl residues since such directly attached acyl groups will be nearly as susceptible to enzymatic cleavage as the acyl groups in a conventional fully digestible triglyceride, thus reducing the usefulness of the composition as a low calorie fat substitute. At the same time the average number of oxypropylene units should not exceed about 16 since the resulting compounds may be substantially lower in melting point or higher in melt viscosity than natural butter fat and thus would not be suitable for use as butter fat substitutes.

The melting profile for a given EPG may be adjusted as needed by varying the average number of oxypropylene units per glycerin (propoxylation number) present in the composition. At a constant fatty acid acyl group content (i.e., if the relative proportions of the different acyl groups present are fixed), the solid fat index at a particular temperature will increase as the propoxylation number is decreased and will decrease as the propoxylation number is increased. As the average number of fatty acid acyl group carbons per equivalent of glycerin decreases or as the iodine number of the composition increases (as a result of increasing the proportion of unsaturated fatty acid acyl groups present), the average number of oxypropylene units per glycerin will need to be decreased to maintain the solid fat index at a given temperature above a predetermined target value. If a particular fatty acid-esterified propoxylated glycerin composition has an undesirably high solid fat index at a given temperature the index may be brought below a predetermined target value by increasing the propoxylation number. By so adjusting the average number of oxypropylene units per equivalent of glycerin, the melting profile of each EPG may be controlled, and one EPG or a mixture of two or more EPGs may be employed to obtain a mimetic composition having a melting profile similar to that for butter fat.

Suitable EPGs may be prepared using either fatty acids or fatty acid derivatives such as fatty acid esters, fatty acid halides, or fatty acid anhydrides. Generally speaking, $C_{12}$–$C_{24}$ saturated linear fatty acids and their derivatives are preferred for use as starting materials for preparing the EPGs of the present invention. Minor amounts of unsaturated and/or branched and/or shorter chain fatty acids may also be utilized as explained in more detail below.

In addition, the iodine number (which reflects the proportion of unsaturated fatty acid acyl groups in the composition) must be less than about 30, more preferably is less than about 20, and most preferably is less than about 10 centigrams $I_2$ per gram of the composition. A relatively minor proportion of unsaturated fatty acid acyl groups may be advantageous, however, in order to ensure that the composition does not melt over an excessively narrow range. Iodine number (also referred to as iodine value) may be measured by AOCS Method Cd 1-25.

The $C_{12}$–$C_{24}$ saturated fatty acid is linear (i.e., nonbranched) and preferably contains only one carboxylic acid functionality. The acyl group may thus correspond to the general structure $$-\overset{\overset{\displaystyle O}{\|}}{C}(CH_2)_n CH_3$$

wherein n is an integer of from 10 to 22. The value of n is most conveniently an even number (e.g., 10, 12, 14, 16, 18, 20, or 22) since the corresponding fatty acids are readily available at low cost from natural sources such as edible triglycerides. Specific illustrative fatty acids suitable for use as this component of the esterified propoxylated glycerin compositions include, but are not limited to lauric acid, myristic acid, stearic acid, palmitic acid, eicosanoic (arachidic) acid, heneicosanoic acid, docosanoic (behenic) acid, tricosanoic acid, and tetracosanoic (lignoceric) acid. Mixtures of these $C_{12}$–$C_{24}$ saturated linear fatty acids may also be utilized to advantage, as discussed above.

While all of the acyl groups in the fatty acid-esterified propoxylated glycerin composition may be derived from $C_{12}$–$C_{24}$ saturated linear fatty acid, the compositions may contain minor amounts of acyl groups derived from other $C_8$–$C_{24}$ fatty acids. Preferably, the proportion of such other acyl groups is less than about 40%. Generally speaking, the incorporation of acyl groups which are relatively short in length ($C_8$–$C_{18}$), unsaturated, and/or branched will tend to decrease the melting point of the resulting EPG.

The fatty acids which optionally may be used in combination with the $C_{12}$–$C_{24}$ saturated linear fatty acids may be any of the known fatty acids such as caprylic acid, pelargonic acid, capric acid, oleic acid, cetoleic acid, palmitoleic acid, gadoleic acid, erucic acid, ricinoleic acid, linoleic acid, linolenic acid, myristoleic acid, eleostearic acid, arachidonic acid, or mixtures of these acids. Preferably, linear monocarboxylic acids containing from 0 to 5 double bonds are employed.

The proportions and chemical structures of the fatty acid acyl groups in the butter fat mimetic compositions of this invention should be selected such that the solid fat indices of the mimetic compositions as determined by dilatometry are similar to those for butter fat over the temperature range from 32° F. (0° C.) to 104° F. (40° C.). In other words, the melting profile as measured by dilatometry should be more than about 60 at 50° F., between about 15 and about 35 at 70° F. and less than about 5 at 92° F. Increasing the ratio of average number of fatty acid acyl group carbons per equivalent of glycerin to the average number of oxypropylene units per equivalent of glycerin will shift the melting range of an EPG to a higher average temperature while decreasing the ratio will shift the melting range to a lower average temperature. The melting profile of the butter fat substitute can thus be conveniently matched to that of natural butter fat by adjusting this ratio and/or blending various different EPGs as needed.

The average number of fatty acid acyl group carbons per equivalent of glycerin in the fatty acid-esterified propoxylated glycerin compositions of the invention may be readily calculated from a knowledge of the fatty acid acyl group content (i.e., the chemical structures and relative proportions of the fatty acids used to prepare the compositions). The following formula may be used to calculate this average number (N.) for a fatty acid-esterified propoxylated glycerin composition prepared using fatty acids A and B:

$$N_a = \frac{\text{moles } A \times \text{no. carbons in } A}{\text{moles propoxylated glycerin}} + \frac{\text{moles } B \times \text{no. carbons in } B}{\text{moles propoxylated glycerin}}$$

For example, a composition prepared by reacting a mixture of 1.5 moles of stearic acid (a $C_{18}$ fatty acid) and 1.5 moles of eicosanoic acid (a $C_{20}$ fatty acid) with 1 mole of propoxylated glycerin containing an average of 7 oxypropylene units per glycerin will have an average of 57 fatty acid acyl carbons per equivalent of glycerin.

To minimize the available caloric content of the fatty acid-esterified propoxylated glycerin butter fat substitutes of this invention, the chemical composition should be selected such that the number average molecular weight is at least about 800. More preferably, the minimum molecular weight is about 1,000. In order for the fatty acid-esterified propoxylated glycerin composition to mimic as closely as possible the physical properties of butter fat (such as melt viscosity and hardness) it is also desirable that the number average molecular weight not exceed about 2,200. Preferably, the molecular weight is below about 2,000.

In a preferred embodiment of the invention, stearic (i.e. $C_{18}$) fatty acid compositions are employed. Fatty acids which are predominantly stearic, having at least about 75% and preferably at least about 80% by weight of saturated $C_{18}$ fatty acid, are most preferred. For example, hydrogenated soybean fatty acid is predominantly stearic, generally from about 83% to about 93% by weight, and it has been found to be particularly suitable for preparing the butter fat substitutes of the invention. Other fatty acid sources having more than about 75% stearic acid after hydrogenation include corn oil, cottonseed oil, olive oil, peanut oil, canola (low erucic rapeseed) oil, safflower oil, sesame oil, sunflower oil and mixtures thereof.

A particularly preferred embodiment of the invention is a mixture of a fatty acid-esterified propoxylated glycerin composition having an average number of oxypropylene units per equivalent of glycerin (propoxylation number) of about 5 wherein at least about 80% by weight of the fatty acid is stearic acid, and a fatty acid-esterified propoxylated glycerin composition having a propoxylation number of about 14 wherein at least about 80% by weight of the fatty acid is stearic acid, an iodine number less than about 10, an average number of fatty acid acyl group carbons per equivalent of glycerin of from about 48 to about 56, and a melting profile similar to butter fat.

The fatty acid-esterified propoxylated glycerin butter fat substitutes of this invention may be prepared using any suitable method. In general, the procedures described in the prior art for synthesizing other fatty acid-esterified propoxylated glycerin compositions will be appropriate for use provided that the necessary $C_{12}$–$C_{24}$ saturated linear fatty acids (or precursors thereof) or fatty acid derivatives are employed in the esterification step. Such procedures are described, for example, in U.S. Pat. Nos. 4,861,613 (the White patent, referenced above) and 4,983,329 and in European Patent Publication No. 353,928, the disclosures of which are incorporated by reference herein in their entirety. As is explained in more detail in the above-mentioned publications, either fatty acids or fatty acid equivalents such as fatty acid esters, fatty acid halides, or fatty acid anhydrides may actually be employed in the esterification. The $C_{12}$–$C_{24}$ saturated linear fatty acid acyl groups may also be introduced by using $C_{12}$–$C_{24}$ unsaturated fatty acids in the esterification step and then hydrogenating the fatty acid-esterified propoxylated glycerin composition to increase the proportion of $C_{12}$–$C_{24}$ saturated linear fatty acid acyl groups to the desired level. Any residual free fatty acid remaining in the composition after esterification should preferably be removed or reduced as much as possible to minimize problems with off flavor, off-odor, or storage stability.

The fatty acid-esterified propoxylated glycerin compositions of the present invention are particularly suitable for use as full or partial replacements for butter fat in frozen confections such as ice cream-type desserts. Typically, ice cream is comprised of about 10 to about 20 weight percent of a fat component. To achieve a significant reduction in available caloric content, it will generally be desirable for at least about 25 weight percent of the fat component to be a fatty acid-esterified propoxylated glycerin composition of this invention. The balance of the fat component may be butter fat or a different butter fat substitute, equivalent or mimetic. The amount of the butter fat mimetic may, if desired, constitute up to 100% of the total fat in the product.

In addition to the fat component comprised of the fatty acid-esterified propoxylated glycerin composition, the frozen confection of the invention may further comprise one or more conventional food, confectionery, or other ingredients such as sugars (e.g., sucrose, fructose, glucose, maltose), water, flavorings such as cocoa powder, chocolate liquor, cocoa mass, vanilla or nut or fruit flavorings, milk solids (non-fat, skimmed, or whole), emulsifiers such as lecithin, antioxidants, dietary fibers, vitamins, bulking or bodying agents such as polydextrose or modified starch, salt, and the like. A sugar alcohol such as sorbitol, xylitol, or mannitol or a reduced calorie sweetener such as saccharine, aspartame, cyclamates, sucralose, acesulfame, acesulfam-K, or the like may also be employed in combination with the fatty acid-esterified propoxylated glycerin composition of the invention.

Food products in accordance with the invention may be readily prepared by replacing the butter fat component of a standard formulation with the fatty acid-esterified propoxylated glycerin butter fat mimetics described hereinabove using known processing methods and techniques as will be apparent to those skilled in the art. Representative publications having to do with frozen confections include the following: *ICE CREAM*, W. S. Arbuckle; 1986, Van Nostrand Reinhold Company Inc., 115 Fifth Avenue, New York, N.Y. 10003; *THE CHEMISTRY AND TECHNOLOGY OF FOOD AND FOOD PRODUCTS*, Vol. II, M. Jacobs; 1951, Interscience Publishers, Inc., 250 Fifth Avenue, New York, N.Y.; *THE NEW PROFESSIONAL CHEF*, The culinary Institute of America, 1991; Van Nostrand Reinhold, 115 Fifth Avenue, New York, N.Y. 10003; and *THE FANNIE FARMER COOKBOOK*, Wilma Lord Perkins; 1965, Little, Brown and Company, Boston. Toronto.

The ice cream-type frozen dessert of the invention is prepared using as a replacement for some or all of the butter fat in an ice cream recipe a butter fat mimetic composition comprised of one EPG or, preferably, two or more EPGs wherein the mimetic composition has a melting profile similar to that for butter fat. The recipe according to the invention comprises from about 0% to about 75% by weight of a fat component and from about 100% to about 25% by weight of the butter fat mimetic composition of the invention. Suitable mimetic compositions can be identified by those skilled in the art by comparing the melting profile of a composition comprising one or more EPG compositions with the melting profile for butter fat.

The process of making the ice-cream type frozen dessert of the invention generally follows the conventional recipes for making ice cream except that the butter fat mimetic composition of the invention is used to replace all or a part of the butter fat component of the recipe. Accordingly, after the ingredients are prepared and admixed to form a composition for making the frozen dessert (i.e. a "frozen dessert composition") the composition is then frozen with aeration, for example by freezing in an ice cream freezer, followed by use or by storage in a freezer.

Soybean fatty acids have been found to be particularly suitable and, as illustrated in FIG. 1, the combination of FHEPG-05 and FHEPG-14 has been found to follow closely the melting profile for butter fat. Separately, neither of these EPGs seems to be a likely candidate for a butter fat substitute. However, when blended in the weight ratio of 60/40, FHEPG-05 being 60% by weight and FHEPG-14 being 40% by weight, the resulting low-calorie fat behaves much like the butter fat.

The EPGs utilized in the examples of the invention were synthesized from soybean fatty acid and propoxylated glycerin (prepared by reacting 5 or 14 equivalents of propylene oxide per equivalent of glycerin under base-catalyzed conditions) and physically refined. The resulting materials were hydrogenated to saturation (IV<4), bleached and deodorized. The deodorized products were fortified with a mixed tocopherol blend of 50% Covi-ox T70 and 50% Covitol F1300 (both available from Henkel Corp., La Grange, Ill., U.S.A.) to a level of 0.16%. The finished products were characterized using analytical methods commonly used by the industry to evaluate oils and fats. These methods included Wijs iodine value (AOCS Cd 1–25), dropping point (AOCS Cc 18–80 (93)) and solid fat index (AOCS Cd 10–57).

The iodine value for the FHEPG-05 soyate employed in the following examples was 2.2 and for FHEPG-14 soyate it was 1.7. The dropping point for the FHEPG-05 was measured at 79.9 and for FHEPG-14 was measured at 63.7.

The solid fat index data points for the components represented in Figure I are set forth in Table I as follows:

TABLE I

| SOLID FAT INDICES OF EPG BLENDS AND BUTTER FAT | | | | | |
|---|---|---|---|---|---|
| Temperature °F. | 32 | 50 | 75 | 92 | 104 |
| FHEPG-05 | 97.30 | 91.50 | 75.50 | 0.20 | 0.00 |
| FHEPG-14 | 77.50 | 18.60 | 0.20 | 0.04 | 0.00 |

TABLE I-continued

SOLID FAT INDICES OF EPG BLENDS AND BUTTER FAT

| Temperature °F. | 32 | 50 | 75 | 92 | 104 |
|---|---|---|---|---|---|
| BUTTER FAT | 87.20 | 69.90 | 26.50 | 4.50 | 0.00 |
| EPG BLEND | 85.00 | 60.10 | 15.20 | 0.00 | 0.00 |

EXAMPLES

Recipes for ice cream were modified to demonstrate the ability of EPG to replace the fats.

Example 1

A control vanilla ice cream was prepared (to check the freezer) as follows:

| INGREDIENTS/PROCEDURE | GRAMS |
|---|---|
| The following were put in a double boiler top | |
| ¼ cup cold water | 125 |
| 1 teaspoon gelatin | 10 |
| This was allowed to stand for 5 minutes, and then we added the following: | |
| 1 cup hot Half-and-Half | 500 |
| A separate mix was prepared of the following: | |
| ¼ cup sugar | 125 |
| 3 tablespoons corn syrup | 90 |
| 1 teaspoon flour | 10 |
| salt | 1 |

The separate mix was added to the gelatin and Half-and-Half. It was cooked and stirred over low heat until thickened followed by covering and cooking over hot water for 10 minutes.

| 1 egg yolk (stirred in slowly) | 32 |
|---|---|

This was cooked for 1 minute and then we added the following:

| 1 pint heavy cream | 1000 |
|---|---|
| 1 egg white, beat well | 72 |
| 1 teaspoon vanilla | 10 |
| Total | 1975 |

The ingredients were blended well, processed in an ice cream freezer and stored in the freezer section of a refrigerator.

The recipe yielded a product having excellent flavor and texture.

Example 2

Another control vanilla ice cream was prepared as follows:

| INGREDIENTS | AMOUNT |
|---|---|
| Milk or Half-and-Half | 1 liter |
| Heavy Cream | 1 liter |
| Sugar | 455 grams |
| Egg Yolks | 16 |
| Vanilla Beans or Extract | 3 |
| Salt | a pinch |

Yield: 1 gallon

1. The milk, cream, half the sugar and vanilla were combined in a heavy-bottomed pot. The mixture was brought to a boil.
2. The remaining sugar was combined with the egg yolks, and this mixture was tempered with approximately one third of the boiling milk mixture.
3. The tempered egg yolks were returned to the boiling milk mixture, the mixture was cooked over low heat and stirred continuously until it was homogenized.
4. The ice cream base was strained and cooled over an ice bath. Vanilla beans were split and their interiors were scraped out and added to the ice cream base.
5. The mixture was processed in an ice cream freezer and stored in the freezer section of a refrigerator.

The recipe yielded a product having excellent flavor and texture.

Example 3

A french vanilla ice cream-type frozen confection was prepared to determine the ability of EPG to replace all of the fats without affecting the delicate flavors in vanilla ice cream. The recipe was as follows:

| INGREDIENTS | GRAMS | % |
|---|---|---|
| Granulated Sugar | 60.00 | 6.53 |
| Corn Syrup | 60.00 | 6.53 |
| Non-fat Dry Milk | 11.00 | 1.22 |
| Flour (all purpose) | 5.00 | 0.55 |
| Modified Food starch | 2.00 | 0.22 |
| Modified Whole Milk Powder | 1.00 | 0.10 |
| Vanillin | 0.50 | 0.05 |
| Salt | 0.50 | 0.05 |
| Skim milk | 500.00 | 54.00 |
| FHEPG-14 | 202.00 | 22.00 |
| Egg White Powder | 5.00 | 0.55 |
| Water | 72.00 | 8.20 |
| Totals | 919.00 | 100.00 |

Procedure:
1. All ingredients, except the egg white and water, were placed in a double boiler top and heated to 160° F. and held for 30 minutes.
2. The mixture was homogenized.
3. The egg whites were dispersed in the water, beat well and then added to the emulsion.
4. The product was cooled in a refrigerator and then was frozen in an ice cream maker.

The formulation produced a fine stable emulsion having good rich taste. No off flavors were noticed.

In a variation of the recipe, 10 grams (1.08%) of defatted cocoa powder were added to the foregoing ingredients, bringing the total amount to 929.0 grams and resulting in a slightly heavier texture. The flavor was slightly too mild. It tasted like malted milk.

Example 4

The ability of FHEPG-14 to replace all the fats in chocolate ice cream was evaluated using the following recipe.

| INGREDIENTS | GRAMS | % |
|---|---|---|
| Granulated Sugar | 130.4 | 6.52 |
| Corn Syrup | 129.2 | 6.46 |
| Non-fat Dry Milk | 24.4 | 1.22 |
| Flour | 10.0 | 0.50 |
| Acacia Gum | 3.2 | 0.16 |
| Modified Whole Milk Powder | 2.0 | 0.10 |
| Defatted Cocoa Powder | 21.6 | 1.08 |
| Vanillin | 1.0 | 0.05 |
| Salt | 1.0 | 0.05 |
| Skim Milk* | 1076.4 | 53.82 |
| FHEPG-14 | 435.0 | 21.75 |
| Egg White Powder** | 10.8 | 0.54 |
| Water | 155.0 | 7.75 |
| Total | 2000.0 | 100.00 |

*Prepared by dissolving 100 grams of non-fat dry milk with water and bringing to 1000 milliliters volume.
**Prepared separately by whipping with water.

Procedure:
1. All dry ingredients were placed in a double boiler top and mixed well. The corn syrup and skim milk were added and mixed.
2. The mixture was heated to 160° F. over boiling water and held at this temperature for ½ hour. The fat replacement composition was added and blended well.
3. The egg white powder was added to the water and whipped.
4. The whipped egg whites were tempered with the hot mixture and combined in the double boiler top.
5. The mixture was homogenized and placed in a refrigerator for 4 hours.
6. Following refrigeration, the batch was placed in an ice cream freezer and allowed to harden.

The initial consistency of the ice cream was comparable to a soft serve but it melted too quickly in the mouth and the flavor lacked the fullness and creaminess of a typical chocolate ice cream. Also, the product froze too hard when stored in the freezer.

Example 5

A chocolate ice cream-type frozen dessert was made with FHEPG-14 and FHEPG-05 as follows:

| INGREDIENTS | GRAMS | % |
|---|---|---|
| Granulated Sugar | 150.00 | 8.06 |
| Corn Syrup | 92.00 | 4.94 |
| Non-fat Dry Milk | 122.00 | 6.56 |
| Acacia Gum | 2.00 | 0.11 |
| Modified Whole Milk Powder | 3.00 | 0.16 |
| Defatted Cocoa Powder | 35.00 | 1.88 |
| Natural Cream Extract | 4.65 | 0.25 |
| Vanillin | 0.50 | 0.03 |
| Salt | 0.50 | 0.03 |
| Water | 909.35 | 48.89 |
| FHEPG-14 | 236.00 | 12.69 |
| FHEPG-05 | 151.00 | 8.12 |
| Egg White Powder | 10.00 | 0.54 |
| Water | 144.00 | 7.74 |
| Total | 1860.00 | 100.00 |

Procedure:
1. All of the ingredients, except the egg white and the smaller portion of water, were added to a double boiler top and set over boiling water. The mixture was stirred well.
2. The mixture was heated to 160° F. while stirring and held at this temperature for 30 minutes.
3. The egg whites were dispersed in water and beaten well.
4. The beaten eggs were tempered with the hot mix, combined and then homogenized.
5. The homogenized blend was cooled in a refrigerator for 4 hours.
6. The cooled product was frozen in an ice cream freezer.

At first the ice cream appeared very soft but it hardened in the freezer over night. The product had the taste of a good chocolate flavored ice cream.

Example 6

A chocolate ice cream-type frozen dessert was made with FHEPG-14 and FHEPG-05 as follows:

| INGREDIENTS | GRAMS | % |
|---|---|---|
| Granulated Sugar | 161.20 | 8.06 |
| Corn Syrup | 98.80 | 4.94 |
| Non-fat Dry Milk | 203.00 | 10.15 |
| Acacia Gum | 2.20 | 0.11 |
| Modified Whole Milk Powder | 3.20 | 0.16 |
| Dutch Process Cocoa (10–12% fat) | 37.60 | 1.88 |
| Natural Cream Extract (Dried) | 5.00 | 0.25 |
| Vanillin | 0.60 | 0.03 |
| Salt | 0.60 | 0.03 |
| Water | 906.00 | 45.30 |
| FHEPG-14 | 253.80 | 12.69 |
| FHEPG-05 | 162.40 | 8.12 |
| Egg White Spray dried | 10.80 | 0.54 |
| Water | 154.80 | 7.74 |
| Total | 2000.00 | 100.00 |

Procedure: As described in Example 5.

At first the ice cream appeared very soft but it hardened in the freezer over night. The product had the taste of a good chocolate flavored ice cream.

Example 7

Another vanilla ice cream-type frozen dessert was made with FHEPG-14 and FHEPG-05 as follows:

| INGREDIENTS | GRAMS | % |
|---|---|---|
| Granulated Sugar | 161.20 | 8.06 |
| Corn Syrup | 98.80 | 4.94 |
| Non-fat Dry Milk | 240.00 | 12.00 |
| Acacia Gum | 3.00 | 0.15 |
| Modified Whole Milk Powder | 2.00 | 0.10 |
| Natural Cream Extract (Dried) | 5.00 | 0.25 |
| Vanillin | 1.00 | 0.05 |
| Salt | 1.00 | 0.05 |
| FHEPG-14 | 253.80 | 12.69 |
| FHEPG-05 | 162.40 | 8.12 |
| Water | 906.00 | 45.30 |
| Egg White Powder | 10.80 | 0.54 |
| Water | 155.0 | 7.75 |
| Total | 2000.00 | 100.00 |

Procedure:
1. All ingredients, except the egg white and the smaller portion of water, were placed in a double boiler top and set over boiling water and stirred well.
2. The temperature of the mixture was brought to 160° F. with constant stirring and held at that temperature for 30 minutes.

3. The egg whites were dispersed in water and beaten very well.

4. The beaten eggs were tempered with the hot mix, combined and homogenized.

5. The homogenized blend was cooled below room temperature followed by freezing in an ice cream maker.

A rich, creamy, good tasting ice cream resulted.

What is claimed is:

1. A butter fat mimetic composition comprised of a fatty acid-esterified propoxylated glycerin composition having a melting profile similar to the melting profile for butter fat.

2. The composition of claim 1 wherein the fatty acid-esterified propoxylated glycerin composition comprises at least two different fatty acid-esterified propoxylated glycerin compositions.

3. The composition of claim 2 wherein at least about 75% by weight of the fatty acid in each fatty acid-esterified propoxylated glycerin composition is stearic acid.

4. The composition of claim 2 wherein the fatty acids in the fatty acid-esterified propoxylated glycerin compositions are derived from an oil selected from the group consisting of soybean oil, corn oil, cottonseed oil, olive oil, peanut oil, canola oil, safflower oil, sesame oil, sunflower oil and mixtures thereof.

5. The composition of claim 4 wherein the different soybean fatty acid-esterified propoxylated glycerin compositions are 1) a fully hydrogenated soybean fatty acid-esterified propoxylated glycerin composition having a propoxylation number of 5 and 2) a fully hydrogenated soybean fatty acid-esterified propoxylated glycerin composition having a propoxylation number of 14.

6. The composition of claim 5 wherein the weight to weight ratio of the first fatty acid-esterified propoxylated glycerin composition to the second fatty acid-esterified propoxylated glycerin composition is from about 60:40 to about 30:70.

7. The composition of claim 6 having a melting profile of more than about 60° at 50° F., between about 15° and about 35° at 70° F. and less than about 5° at 92° F.

8. A frozen confection having a fat component, said fat component comprising a fatty acid-esterified propoxylated glycerin composition having a melting profile similar to that for butter fat.

9. The frozen confection of claim 8 wherein said fatty acid-esterified propoxylated glycerin composition comprises at least two different fatty acid-esterified propoxylated glycerin compositions.

10. The frozen confection of claim 9 wherein at least about 75% by weight of the fatty acid in each fatty acid-esterified propoxylated glycerin composition is stearic acid.

11. The frozen confection of claim 9 wherein the fatty acids in the fatty acid-esterified propoxylated glycerin compositions are derived from an oil selected from the group consisting of soybean oil, corn oil, cottonseed oil, olive oil, peanut oil, canola oil, safflower oil, sesame oil, sunflower oil and mixtures thereof.

12. The frozen confection of claim 11 wherein the different soybean fatty acid-esterified propoxylated glycerin compositions are 1) a fully hydrogenated soybean fatty acid-esterified propoxylated glycerin composition having a propoxylation number of 5 and 2) a fully hydrogenated soybean fatty acid-esterified propoxylated glycerin composition having a propoxylation number of 14.

13. The frozen confection of claim 12 wherein the weight to weight ratio of the first fatty acid-esterified propoxylated glycerin composition to the second fatty acid-esterified propoxylated glycerin composition to the second composition is from about 60:40 to about 30:70.

14. The frozen confection of claim 13 wherein the fatty acid-esterified propoxylated glycerin composition has a melting profile of more than about 60° at 50° F., between about 15° and 35° at 70° F. and less than about 5° at 92° F.

15. A method of making a frozen confection comprising forming a frozen dessert composition having from about 0% to about 75% by weight of a fat component and from about 100% to about 25% by weight of a butter fat mimetic composition comprised of a fatty acid-esterified propoxylated glycerin composition having a melting profile similar to the melting profile for butter fat, and freezing the frozen dessert composition with aeration.

16. The method of claim 15 wherein the fatty acid-esterified propoxylated glycerin composition comprises at least two different fatty acid-esterified propoxylated glycerin compositions.

17. The method of claim 16 wherein at least about 75% by weight of the fatty acid in each fatty acid-esterified propoxylated glycerin composition is stearic acid.

18. The method of claim 16 wherein the fatty acids in the fatty acid-esterified propoxylated glycerin compositions are derived from an oil selected from the group consisting of soybean oil, corn oil, cottonseed oil, olive oil, peanut oil, canola oil, safflower oil, sesame oil, sunflower oil and mixtures thereof.

19. The method of claim 17 wherein the different soybean fatty acid-esterified propoxylated glycerin compositions are 1) a fully hydrogenated soybean fatty acid-esterified propoxylated glycerin composition having a propoxylation number of 5 and 2) a fully hydrogenated soybean fatty acid-esterified propoxylated glycerin composition having a propoxylation number of 14.

20. The method of claim 19 wherein the weight to weight ratio of the first fatty acid-esterified propoxylated glycerin composition to the second fatty acid-esterified propoxylated glycerin composition is from about 60:40 to about 30:70.

21. The method of claim 20 wherein the butter fat mimetic composition has a melting profile of more than about 60° at 50° F., between about 15° and about 35° at 70° F. and less than about 5° at 92° F.

* * * * *